United States Patent [19]

Stilwell et al.

[11] 3,773,981

[45] Nov. 20, 1973

[54] PARALLEL TONE MULTIPLEXER-RECEIVER

[75] Inventors: George R. Stilwell, West Nyack; Alfred Weiss, Ossining, both of N.Y.

[73] Assignee: International Business Machines Corporation, Armonk, N.Y.

[22] Filed: Aug. 7, 1972

[21] Appl. No.: 278,324

[52] U.S. Cl. .......................... 179/15 BA, 179/15 BY

[51] Int. Cl. .......................... H04j 3/16

[58] Field of Search .......................... 179/15 BA, 15 BY, 179/15 BW, 15 BV

[56] References Cited

UNITED STATES PATENTS

| | | | |
|---|---|---|---|
| 3,466,397 | 9/1969 | Benowitz | 179/15 BA |
| 3,603,725 | 9/1971 | Cutler | 179/15 BA |
| 3,641,273 | 2/1972 | Herold | 179/15 BW |

*Primary Examiner*—Ralph D. Blakeslee
*Attorney*—Richard C. Sughrue et al.

[57] ABSTRACT

Parallel tone signals received on a plurality of input lines are digitized. Specific tone combinations represent different data, such as a particular digit or character. A received signal is considered a valid data signal if it is of at least a predetermined minimum time duration. The digitized signals are read into individual shift registers for each line. The length of each shift register is sufficient to store two data signals, each of the predetermined minimum valid time duration. The tone signals received on the input lines are asynchronous and of variable time duration. A multiplexer sequentially reads out the storage registers at a rate which is relatively high compared to the rate at which the digitized signals are entered into the registers. The time-division-multiplexed serial samples from all registers are reconverted to the input tone signals, frequency separated and detected in a multi-frequency receiver, and then applied to a demultiplexer so that the detected signals appear on a plurality of output lines corresponding to the plurality of input lines. Even though each register is completely read out during each sample time by the multiplexer, the last half of the signal stored in a register is recirculated back into the register to be read out as the first half of the register's contents the next time the line is sampled by the multiplexer, thereby eliminating the possibility of the loss of a digit or character during the multiplexing process.

10 Claims, 4 Drawing Figures

PARALLEL TONE MULTIPLEXER-RECEIVER

CROSS-REFERENCE TO RELATED APPLICATION

Pending application Ser. No. 99,383, filed Dec. 18,1970, discloses a parallel tone detector which may be used as a multifrequency receiver in conjunction with the present invention.

BACKGROUND OF THE INVENTION

1.Field of the Invention

The invention relates generally to the field of time-division-multiplexing wherein a plurality of simultaneous asynchronously occurring input signals of varying duration are digitized, stored and time-division-multiplexed without the lose of any information represented by the input signals.

2. Description of the Prior Art

In the prior art, when a plurality of parallel tone signals were to be received on a corresponding plurality of input lines of a central receiving station, a separate multifrequency receiver was required for each input line in order to receive and detect the parallel tone signals appearing on that line. Each parallel tone receiver typically included a set of audio-frequency filters or tuned circuits for separating the incoming frequencies and converting them into d.c. output signals in parallel form, which signals indicated exactly what frequencies are present on the incoming line. The receiver used in parallel tone telephone digit dialing applications is rather complex because of the various means used to protect against unwanted noise and speech signals on the line. Such a receiver includes carefully controlled threshold detectors, one out of N circuits, and signal duration means to protect against talk off, i.e., the simulation of digit tone signals by speech signals.

Where parallel tone signals are being received simultaneously at a central receiving station on a plurality of input lines, the cost of providing such a receiver for each input line is prohibitive, and, in addition, the space occupied by such a plurality of individual receivers would be undesirable.

SUMMARY OF THE INVENTION

The general object of the invention is to provide a means and method for multiplexing and analyzing by means of a single receiver or detector asynchronously occurring signals of varying time duration appearing simultaneously on a plurality of lines, thereby reducing the cost and bulk of the analog circuitry required.

Another object of the invention is to provide such a means and method for multiplexing a plurality of asynchronous parallel tone signals of varying duration and representing data signals, such as digits or characters, and detecting and receiving the signals without the loss of any information. The term, character, as used herein, will be considered a generic term to designate any data signals, and includes but is not limited to digits and characters.

A more specific object of the invention is to provide a signal multiplexing apparatus and method and wherein received parallel tone analog signals appearing on a plurality of input lines are digitized, stored, time-multiplexed and reconverted to the analog signals without the loss of any information represented by the signals, and wherein each multiplexed sample includes a portion of the previous sample from the same line.

The above objects are accomplished in one preferred embodiment of the invention by digitizing each of the analog input signals on the plurality of input lines, successively storing contiguous portions of each digitized input signal in a shift register, each stored portion corresponding to the input signal received over a length of time equal to twice a predetermined minimum valid time duration, sequentially reading out the entire contents of each shift register at a rate much higher than the rate at which the digitized input signals are stored in the shift registers to produce a series of time-division-multiplexed digitized samples, recirculating the last received half of the contents of each register into the registers so that each multiplexed sample of a shift register contains both a new digitized signal and the last half of the previously read out digitized signal, and reconverting the time-division-multiplexed digitized samples to the corresponding analog signals. The reconverted signals from all the input lines are then applied to a single multiple frequency receiver where they are frequency separated, detected, and demultiplexed to appear on output lines corresponding to the input lines.

DESCRIPTION OF THE PREFERRED EMBODIMENT

The use of parallel tone transmission in widespread due to the low cost of the transmitter and the reliability of transmission. Parallel tone transmission is usually either two-tone (AB) or three-tone (ABC). Applications of parallel tone transmission and reception are: telephone digit dialing, multi-frequency inter-office signaling, etc.

Figures 1, 2:
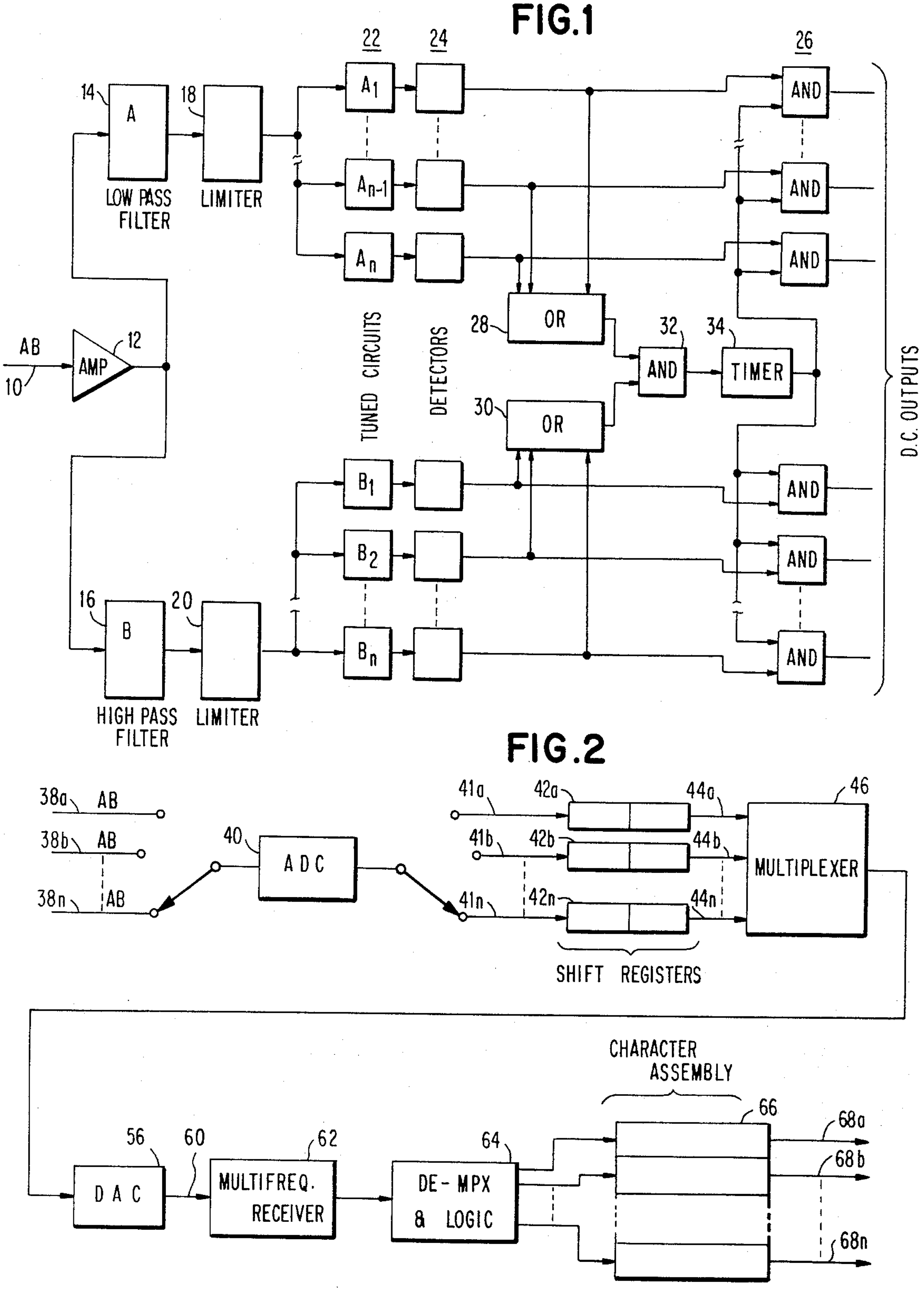
FIG. 1 is a schematic diagram of a typical prior art parallel tone receiver for receiving and detecting parallel tone analog signals appearing on a single input line.
FIG. 2 is a schematic diagram of a preferred embodiment of the invention for multiplexing a plurality of received parallel tone analog signals without the loss of any information represented by the signals.

FIG. 1 illustrates a typical prior art parallel tone receiver for receiving parallel tone analog signals appearing on a single input line. For example, assuming a two-tone (ABC)system, wherein A represents a frequency from a first band of pre-selected frequencies, and B represents a frequency from a second band of pre-selected frequencies, the parallel tone signal AB appearing on the input line 10 is fed through an amplifier 12. The parallel tones are separated into the A and B frequency bands by a low pass filter 14 and a high pass filter 16, respectively. The outputs of the filters are then fed through limiters 18 and 20 and through tuned circuits 22 individually tuned to the pre-selected frequencies in the A and B bands. The outputs of the tuned circuits are then detected in controlled threshold detectors 24, each of whose outputs is applied to one input of a corresponding one of a plurality of AND circuits 26. The outputs of the detectors corresponding to the A band of frequencies is applied to an OR circuit 28 and the outputs of the B band of detectors to an OR circuit 30. The outputs of the OR circuits are applied to the two inputs of an AND circuit 32 which produces a timing start signal whenever there is coincidence in time of A and B tones. The output of the AND circuit initiates the operation of a timer 34 which has a predetermined timing cycle equal to the predetermined minimum time duration for the recognition of a valid character signal. This predetermined minimum time duration is typically set at 40 milliseconds to avoid the simulation of a parallel tone by a speech signal, for example. The output of the timer is connected to the second inputs of the AND gates 26 and disables the AND circuits after the minimum valid time interval of 40 milliseconds has passed. Consequently, if a parallel tone signal is present for the required minimum time duration for the assumed AB input signal, one of the AND gates 26 corresponding to the A frequency band and one corresponding to the B frequency band will each produce d.c. ouptuts indicative of the two frequencies in the AB input signal. One implementation of the timing logic is disclosed in the aforementioned cross-referenced application.

FIG. 2 is a block diagram illustrating the preferred embodiment of the method and apparatus of the invention. A plurality of analog signals of the previously described parallel tone AB type are received asynchronously on the input line 38*a*, 38*b*, ... . . . 38*n*. These analog input signals are converted by an analog-to-digital converter 40 to corresponding digitized signals which appear on the converter output lines 41*a*, 41*b*, ... . . . 41*n*. This analog-to-digital conversion can be accomplished either by means of a single analog-to-digital converter to which the input lines are multiplexed and the output lines demultiplexed, as shown in FIG. 2, or by means of an individual analog-to-digital converter for each input line. The digitized outputs of the converter 40 are serially read into individual storage shift registers 42*a*, 42*b*, ... . . . 42*n*. The outputs of the shift registers are then sequentially sampled, that is read out, by a synchronous multiplexer 46 which sequentially samples the register output line 44*a*, 44*b*, ... . . . 44*n* at a very high rate compared to the rate at which the digitized signals are read into the shift registers.

One of the most critical problems in the development of a parallel tone signal multiplexer is that the parallel tone input signals are asynchronous in time and of variable duration, whereas multiplexer 46, by its nature, is a synchronous mechanism. An important feature of the present invention is that there is no requirement that the storage means for the digitized signals derived from each input line be as large as the total message on the line; i.e., for a typical 10 digit parallel tone telephone dialing code, the shift registers 42 need not be large enough to store the complete 10 digit code. More specifically, the storage required to guarantee against the loss of any input information is only twice that required to store a single analog digit or character of a minimum valid time duration.

The sampled outputs of the registers 42*a* ... . . . 42*n* are sequentially applied to the receiver 62 which operates in the manner previously described. In a typical parallel tone communication system, the minimum valid duration for each analog digit is a function of the receiver response and in telephone networks is typically 40 milliseconds.

Figures 3, 4:
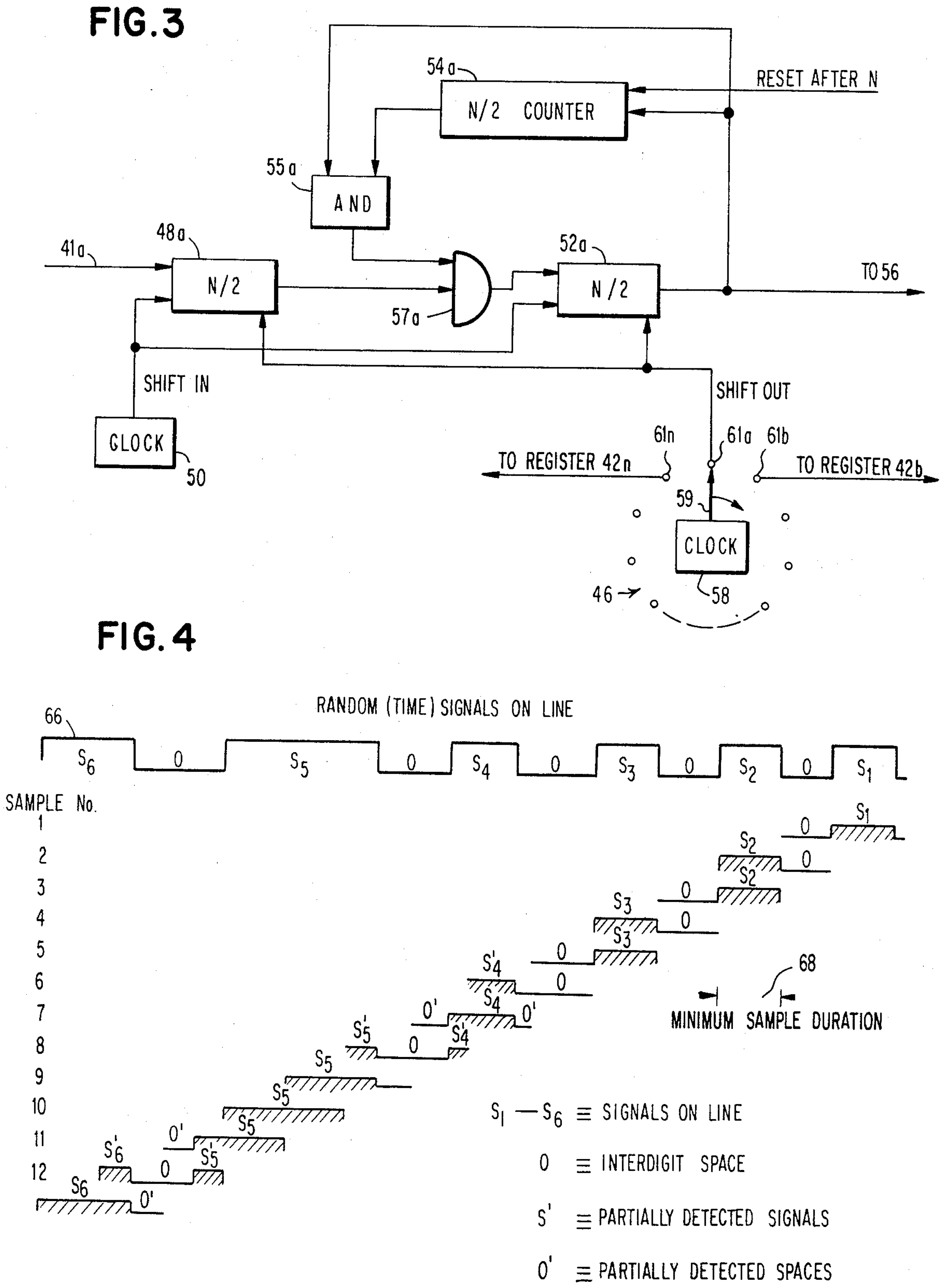
FIG. 3 is a schematic diagram illustrating the operation and structure of the shift registers used in the preferred embodiment of the invention.
FIG. 4 is a timing diagram illustrating the manner in which the present invention operates to prevent the loss of character information for the multiplexing of a plurality of parallel tone analog input signals.

FIG. 3 is a schematic diagram of one of the shift registers 42. Shift register 42*a* is taken as an example. The digitized signals appearing on line 41*a* of the analog-to-digital converter 40 are shifted into the lower half 48*a* of the shift register 42*a* under the control of a clock 50. The clock rate is determined by the sampling rate of the analog-to-digital converter 40 which in turn is determined by the highest expected tone frequency. The capacity of the lower half shift register 48*a* is that required for the filters in the receiver to operate properly, i.e. is large enough to store the minimum predetermined valid signal length which is typically 40 milliseconds. The digitized signals are shifted through the lower half of shift register 48*a* into the upper half of shift register 52*a*. If it is assumed that N/2 bits is equivalent to the number of bits occurring in a digitized signal of the predetermined minimum valid time interval, e.g. 40 milliseconds, then the total capacity of shift register 42*a* is N and that of each of the halves 48*a* and 52*a* is N/2.

Each time the multiplexer 46 samples line 44*a*, the contents of registers 48*a* and 52*a* are serially shifted out in a very short time approximating instantaneous read out relative to the minimum valid time duration. However, the last half of the read out sample is recirculated back into the upper half shift register 52*a* so that it is available for the next multiplexing sample. This recirculation is accomplished by recirculating the original contents of lower half register 48*a* into the upper half register 52*a* as these contents are read out of the upper half register.

The recirculation may be implemented by means of a recirculating loop which includes an N/2 counter 54*a*, an AND circuit 56*a* and an OR circuit 57*a*. During the serial shifting out of the register 42*a* by the multiplexer 46, when N/2 bits have been counted by counter 54*a*, one input of the AND gate 55*a* is enabled so that the second digitized signal, originally stored in the lower half register 48*a*, is recirculated to the input of the upper half register 52*a* as it is shifted out to the input line 44*a*. Counter 54*a* is reset by conventional means after N bits so that it is in condition to repeat its switching operation when the line is next sampled by the multiplexer 46, whereby the recirculation of the upper half register takes place only during the second half of each sample taken by the multiplexer.

Consequently, the registers 42*a*, 42*b* ... . . . 42*n* are read out synchronously, one register at a time, at a rapid rate via the multiplexer 46 into a digital-to-analog converter 56. The multiplexer 46 may simply take the form of a clock 58 sequentially switched to the plurality of registers for predetermined time intervals. This is illustrated in FIG. 3 as a mechanical rotary switch having a movable contact 59 and a plurality of fixed contacts 61*a*, 61*b* . . . 61*n*. In practice, a conventional electrical analog of the rotary switch would be used. In the alternative, a separate clock may be associated with each register. These would be sequentially turned on for predetermined read out time intervals by suitable switch means. The digital-to-analog converter 56 is a high speed converter which must reset rather rapidly for the next sample. The required speed will be shown in sample calculations below.

The output of the digital-to-analog converter 56 is a series of the reconstructed original tone signals AB appearing on the input lines 38*a*, 38*b* . . . ... 38*n*. These signals are fed to a high frequency multi-frequency receiver 62 which may take the form of a multi-frequency receiver shown in FIG. 1. Because of the multiplexing accomplished by this invention, only one such receiver is required for all of the input lines 38a, 38b . . . . . 38n, rather than one receiver being required for each input line as occurred in the prior art.

Referring to FIG. 1, the band pass filters 14 and 16, tuned circuits 22 and detectors 24 separate the output of the digital-to-analog converter 56 and produce at the output of AND gates 26 d.c. signals indicative of the frequencies present in the input signals. The multifrequency receiver 62 for use with this invention need not differ from the receiver shown in FIG. 1 except that all filtering and all frequencies involved are shifted by the ratio of $f_o/f_i$, where:

$f_o$ = the clock rate at which the registers 42 are shifted out into the digital-to-analog converter 56, and $f_i$ = the clock rate at which the analog-to-digital converter 40 is sampled into the shift register 42a, i.e. the clock rate of the clock 50.

The outputs of the multifrequency receiver may be fed through a demultiplex and control logic circuit 64. The function of the control logic is to assemble the detected digits or characters in appropriate buffers and also to interpret the receiver output to insure that one and only one character is stored for each signal on the line irrespective of the number of samples taken of single character signal. This can be accomplished by requiring the recognition of an interdigit space before recognizing another valid character signal. In a CPU environment, this logic can be under software control. The output of the demultiplex and control logic circuit 64 may then be fed to character assembly means 66 which store the assembled digits or characters for each of the output lines 68a, 68b . . . . . 68n corresponding to the original input lines 38a 38b ... 38n.

Following are sample calculations which are to be considered as only exemplary of the operation of the parallel tone analog signal multiplexer of the invention.

It will be assumed that the sinals appearing on the input lines 38a, 38b . . . . . 38n are typical parallel tone telephone dialing signals, and that a multifrequency receiver is to be employed with the multiplexer of the invention.

It will be assumed that the frequencies involved in the parallel tone input signals range from approximately 700 Hz to approximately 1,700 Hz. It will also be assumed that a single analog-to-digital converter will be employed to sample all the input lines, rather than a single analog-to-digital converter for each line. It will also be assumed that the sampling of input signals by the anlog-to-digital converter will occur at a rate ten times the highest expected tone frequency. The minimum valid tone duration will also be assumed to be 40 milliseconds. Then, the number of digitized samples in a minimum length valid character signal will be:

$$1,700 \times 40 \times 10^{-3} \times 10 = 680 \text{ samples},$$

which requires that the total storage for the shift register for each line be 1,360 digitized samples, that is, 680 digitized samples in the lower half shift register and 680 digitized samples in the upper half shift register. Furthermore, the time between samples is $(1/1,700 \times 10)$, which is approximately equal to 60 microseconds.

If the shift register output clock 58 in FIG. 3 is $2,0 \times 10^6$ samples/second, then to shift out 1,360 digitized samples would require 680 microseconds, and the maximum number of lines which could be multiplexed for a 40 millisecond minimum valid character duration would be 40/0.68 or approximately 60 input lines.

During the shift out operation (680/60) or approximately 11 digitized samples from the A/D converter 40 will arrive at the input of the shift register while the shift register is being read out by the multiplexer. These eleven samples which are lost can be ignored since the resulting error is negligible. It should be recognized by those skilled in the art that an additional buffer could be provided to recover those eleven samples, should that be desired.

FIG. 4 illustrates the manner in which the invention operates to multiplex a plurality of input lines carrying asynchronously occurring parallel tone signals of varying duration and representing input digits, without the loss of any digit information. Waveform 66 schematically represents on a time scale the random input charcter signals $S_1$, $S_2$, $S_3$, $S_4$, $S_5$, $S_6$, etc. which may appear on any one of the input lines. O represents the interdigit space, $S'_n$ the partially detected character signals, and 0' the partially deteced interdigit spaces. The minimum samples duration 68 is the predetermined valid input signal duration which in the above example is assumed to be 40 milliseconds, which is also the length or capacity of each of the lower and upper half shift registers.

As shown in FIG. 4, sample No. 1 read out of the shift register consists of a character signal $S_1$ and its following interdigit space 0, each of which is of the minimum sample duration. As shown for sample No. 2, the second sample includes the last half of the first sample, i.e. the interdigit space, plus a new signal $S_2$. By looking at the diagram for samples No. 1 and No. 2, it is seen that an overlap or folding back of time occurs in that the last half of sample No. 1 is the same as the first half of sample No. 2, thereby providing the resulting that no character information is lost. Similarly, the last half of sample No. 2 is identical to the first half of sample No. 3, so that input singal $S_2$ of the minimum sample duration occurs as part of both of the samples. The demultiplex and logic circuit 64 includes means for recognizing the $S_2$ signal appearing in both samples No. 2 and No. 3, without an intervening interdigit space, as a single character signal rather than as two separate $S_2$ signals.

We will now look at the situation where the upper half of the register stores interdigit space while the lower half of the register stores a portion of a valid character, the portion being less than 40 ms, with the remainder of the lower register being filled by an extension of the interdigit space stored in the upper half of the register. For example, the interdigit space following signal $S_3$ extends into the following sampling period. Since the interdigit space extends into the following sample, the first half of sample No. 6 contains both the last half of sample No. 5 and the remaining portion of the extended interdigital space plus a portion $S_4'$ of the signal $S_4$ . Since timer 34 in FIG. 1 is initiated by the leading edge of the signal $S_4'$, the AND gate 26 will not see a tone signal in sample No. 6 for the minimum valid time duration of 40 milliseconds. However, because of the time overlap scheme of the present invention, sample No. 7 will include the last half of sample No. 6 plus the first half of a new sample. In other words, sample No. 7 includes two successive minimum sample durations which, as seen from FIG. 5, include all of Signal $S_4$. Therefore, sample No. 7 will be recognized by timer 34 and AND circuits 26 as containing a valid $S_4$ signal of at least 40 milliseconds durations.

Signal $S_5$ is shown to be substantially longer in time than the minimum sample duration 68. In this case, sample No. 8 includes in its last half thereof a relatively small portion $S_5'$ of the signal $S_5$. However, because of the time overlap scheme, sample No. 9 will include this portion $S_5'$ plus another minimum duration sample of signal $S_5$. Again the receiver and logic circuits will recognize a valid $S_5$ signal.

Consequently, it can be seen that the folding back of time provided by the recirculation of the last half of each sample read out of a shift register guarantees that no information is lost from the data signals appearing on the receiver input lines.

With respect to the use of the multifrequency receiver of FIG. 1, the interdigit spacing will be timed also to insure differentiation between characters. It can be seen from the FIG. 4 that recognition of a partial signal or space is permitted logically since this has no effect on the correctness of the signal detection. The receiver will operate at a higher frequency and consequently filtering will be eased. Active filters can be utilized more readily when the multiplexing scheme of the invention is used.

While the invention has been particularly shown and described with reference to the preferred embodiment thereof, it will be understood by those skilled in the art that various changes in form and details may be made therein without departing from the spirit and scope of the invention.

We claim:

1. A multiplexer for simultaneously receiving a plurality of asynchronous signals of varying time duration comprising:

a. a plurality of input lines each carrying asynchronous input data signals of varying duration;

b. analog-to-digital converter means for digitizing the input signals to produce digitized signals on corresponding output lines of said analog-to-digital converter means;

c. a storage means coupled to each of said output lines for storing the digitized signals;

d. multiplexer means for sequentially reading out of each storage means the signals stored therein to produce a train of time-division-multiplexed digitized samples, the sampling rate of said multiplexer means being substantially greater than the rate at which the digitized signals are entered into said storage means; and e. means for including in the sample for each line the last portion of the previous sample for the line.

2. A multiplexer as defined in claim 1 wherein the capacity of each storage means is equal to twice a predetermined minimum time duration for a valid input signal, and said last portion is the last half of the previous line sample.

3. A multiplexer as defined in claim 2 wherein said storage means for each line comprises:

a. a shift register having a lower half for storing the most recently entered digitized input signal occurring in said minimum time duration, and an upper half for storing the last half of the previously sampled signal for the line; and b. means for recirculating the last half of each sample into said upper half of said shift register.

4. A multiplexer as defined in claim 1 further comprising digital-to-analog converter means for reconverting the digitized samples in the corresponding input data signals.

5. A multiplexer as defined in claim 4 wherein said input data signals are parallel tone signals, and further comprising receiver means for frequency-separating and detecting the reconverted signals.

6. A multiplexer as defined in claim 5 further comprising demultiplexer means for demultiplexing the detected signals into a plurality of output signal lines corresponding to said input lines.

7. A method of multiplexing asynchronously occuring data signals of varying duration appearing on a plurality of input lines comprising the steps of:

a. digitizing the signals appearing on each line;

b. establishing a predetermined minimum time duration for a valid signal;

c. storing the signal appearing on each line for a period equal to twice said predetermined minimum time duration;

d. sampling the stored signal for each line;

e. retaining the last half of each sample so that it forms the first half of the next sample of the line; and f. sequentially sampling all the stored digitized signals at a relatively high rate so that each stored digitized signal is sampled within a fraction of said predetermined minimum time duration, thereby producing a series of time-division-multiplexed digitized samples representative of said data signals.

8. A method as defined in claim 7 wherein said asynchronous data signals of varying time duration are parallel tone analog signals.

9. A method as defined in claim 7 further comprising reconverting the time-division-multiplexed digitized signals into said data signals.

10. A method as defined in claim 9 further comprising the step of demultiplexing the reconverted signals onto a plurality of output lines corresponding to said input lines.

* * * * *

UNITED STATES PATENT OFFICE
CERTIFICATE OF CORRECTION

Patent No. 3,773,981 Dated November 20, 1973

Inventor(s) George R. STILWELL et al

It is certified that error appears in the above-identified patent and that said Letters Patent are hereby corrected as shown below:

First Inventor's Name: After "Stilwell" insert -- Jr. --

Column 1, line 15 - between "the" and "of" delete "lose" and insert -- loss --

Column 5, line 59 - in equation delete "10ˉ3" and insert -- $10^{-3}$ -- line 64 - delete "(1/1,700 x 10)" and insert -- 1/1,700 x 10 -- line 67 - delete "2,0" and insert -- 2.0 --

Column 6, line 5 -- delete "(680/60)" and insert -- 680/60 -- line 21 - delete "O" and insert -- 0 -- line 38 - delete "resulting" and insert -- result --

Column 8, line 15 - after "samples" delete "in" and insert -- into --

Signed and sealed this 9th day of April 1974.

(SEAL)
Attest:

EDWARD M.FLETCHER
Attesting Officer

C. MARSHALL DANN
Commissioner of Patents